(12) United States Patent
Shah et al.

(10) Patent No.: US 7,587,638 B2
(45) Date of Patent: Sep. 8, 2009

(54) METHOD AND SYSTEM FOR GENERATING AND MONITORING VARIABLE LOAD ON AN APPLICATION UNDER TEST

(75) Inventors: Achal K. Shah, Redmond, WA (US); Alexandre M. Gimenez, Woodinville, WA (US); Ansuman Kar, Redmond, WA (US); Doru C. Nica, Sammamish, WA (US); George W. Routon, Redmond, WA (US); Tyrone Sequeira, Kirkland, WA (US); Vijayaraghavan Vedantham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 11/067,487

(22) Filed: Feb. 25, 2005

(65) Prior Publication Data

US 2006/0195725 A1    Aug. 31, 2006

(51) Int. Cl.
    *G06F 11/00*    (2006.01)
(52) U.S. Cl. .............................. 714/38; 714/25; 714/33; 714/47
(58) Field of Classification Search .................. 714/25, 714/33, 38, 47
    See application file for complete search history.

(56) References Cited

U.S. PATENT DOCUMENTS

| | | | | |
|---|---|---|---|---|
| 5,974,572 | A * | 10/1999 | Weinberg et al. | 714/47 |
| 6,167,534 | A * | 12/2000 | Straathof et al. | 714/38 |
| 6,304,982 | B1 * | 10/2001 | Mongan et al. | 714/38 |
| 6,665,268 | B1 * | 12/2003 | Sato et al. | 714/25 |
| 6,694,288 | B2 * | 2/2004 | Smocha et al. | 714/47 |
| 6,721,686 | B2 | 4/2004 | Malmskog et al. | |
| 6,738,933 | B2 | 5/2004 | Fraenkel et al. | |
| 6,754,701 | B1 | 6/2004 | Kessner et al. | |
| 7,047,446 | B1 * | 5/2006 | Maurer et al. | 714/38 |
| 7,111,204 | B1 * | 9/2006 | Couturier et al. | 714/39 |
| 7,334,162 | B1 * | 2/2008 | Vakrat et al. | 714/38 |
| 2002/0147942 | A1 * | 10/2002 | Moe et al. | 714/38 |
| 2003/0028828 | A1 * | 2/2003 | Kakimoto | 714/47 |

(Continued)

FOREIGN PATENT DOCUMENTS

WO    WO01/69412    9/2001

OTHER PUBLICATIONS

Buret, Julien and Droze, Nicolas, "An Overview of Load Test Tools," Initial Release Date Feb. 27, 2003, Latest Corrections May 21, 2003 (31 pages).

*Primary Examiner*—Robert Beausoliel
*Assistant Examiner*—Joseph D Manoskey
(74) *Attorney, Agent, or Firm*—Perkins Coie LLP

(57) ABSTRACT

A facility executes on a central computer system and applies a time-varying load to an application program under test (AUT). The facility executes in a multiple number of modes or hierarchical levels as dictated by information provided in its configuration file. An instance of the facility executing at the highest or first-level of the hierarchy is responsible for spawning numerous subordinate or second-level instances of the facility on, for example, remote computer systems. These second-level instances of the facility may spawn additional subordinate or third-level executors on the same or remote computer systems. Ultimately, the lowest-level or leaf instances of the facility are spawned, and these leaf instances of the facility are responsible for launching the client test program instances that are used to test the AUT.

20 Claims, 8 Drawing Sheets

U.S. PATENT DOCUMENTS

2003/0053420 A1 3/2003 Duckett et al.
2003/0182408 A1 9/2003 Hu
2005/0228621 A1* 10/2005 Matsuo et al. ................. 703/1

* cited by examiner

Test Phase Information File

Phase 1: ⁓ 202
    Phase Duration ⁓ 204
    Activity A:
  208 ⁓ Name
  210 ⁓ Point Rating
  212 ⁓ Rate
  214 ⁓ Target
  216 ⁓ Resources to Use in Performing the Activity
  218 ⁓ Latency Time Limit
  220 ⁓ Rate Limit
    Activity B:
      . . .
    Activity C:
      . . .
  . . .
    Activity N:
      . . .

} 206

Phase 2: ⁓ 202
    Phase Duration ⁓ 204
    Activity List ⁓ 206

. . .

Phase G: ⁓ 202
    Phase Duration ⁓ 204
    Activity List ⁓ 206

*FIG. 2*

Configuration File

```
Parent: ~ 302
AUT Information: ~ 304
    Address ~ 320
    Passwords ~ 322
    AUT Access Information ~ 324

AUT Instance Information: ~ 326
        AUT Instance 1:
            328 ~ Address
            330 ~ Capacity
            332 ~ Use Duration
        AUT Instance 2:
            ⋮

List of Available Computer Systems ~ 306
Load Rating for Each Computer System ~ 308
Number of Second-Level Executors ~ 310
List of Activities to be Performed by Each Second-Level Executor ~ 312
List of Target Rates ~ 314
Load Rating for Each Client Test Program ~ 316
```

*FIG. 3*

Client Configuration File

Parent: ~ 402

AVT Information: ~ 404

List of Activities to Perform ~ 406

No. of Times to Perform Each Activity ~ 408

*FIG. 4*

Test Package

| 502 | 504 |
|---|---|
| Executor | Client Test Program |

*FIG. 5*

METHOD AND SYSTEM FOR GENERATING AND MONITORING VARIABLE LOAD ON AN APPLICATION UNDER TEST

TECHNICAL FIELD

The described technology is directed generally to load testing software applications and, more particularly, to generating and monitoring variable loads on a software application.

BACKGROUND

The proliferation of computers and the advent of the Internet and the maturing of the World Wide Web ("web") have resulted in the development of new and improved software applications for both business and personal uses. Examples of software applications include collaboration applications, chat room applications, instant messaging applications, conferencing applications, gaming applications, and the like. These software applications are often tested prior to commercial release in order to ensure proper operation of the software applications.

One aspect of software testing focuses on ensuring reliable operation of a software application under anticipated loads. Load testing is a process by which a software application is tested under load—i.e., stress—that the software application is likely to experience in a real operation environment. Load tests are end-to-end performance tests that test the application program under an anticipated production load, which is typically based on a prediction of how the end users would use the software application. One objective of the load tests is to determine the response times for various operations performed by the application program. Another objective of the load tests is to measure the capability of the application program to function correctly under load.

There are a number of traditional approaches to load testing. One approach is to employ live users to load test the application program. The application program developer creates a laboratory with computers and communications equipment, and hires live users to access the application program in order to drive the application program under load. A major drawback to this approach is its prohibitive cost. To properly test the application program under anticipated loads may require the use of hundreds or even thousands of computers and live users, who will need to be trained in the operation and use of the application program. In addition, test scripts may need to be prepared for each live user to ensure adequate testing of various functions of the application program. Moreover, test directors may need to be present during the testing in order to coordinate certain aspects of the load testing.

Another approach is to use test scripts to load test the application program. Test scripts are commonly written using a "scripting" language and usually require the use of an interpreter. The interpreter links to the application program, typically a programming interface of the application program, and sends commands to the application program in accordance with the commands in the test script. A test developer or developers who are familiar with the scripting language and the application program prepare the test scripts for load testing the application program. The test scripts are then tested to ensure proper operation, and if errors are found or the test scripts do not operate correctly, the test developer revises or corrects the test scripts. The test scripts are then loaded onto a large number of machines, typically in a laboratory, and executed to load test the application program. A major drawback to this approach is that it is very expensive. To properly develop the test scripts requires a significant amount of the test developers' time, which tends to be very expensive. Another drawback is that the test scripts do not provide an adequate mechanism for interaction between the test scripts, thus making it very difficult to coordinate the testing of the features of the application program. Still another drawback is the static nature of the test commands contained in the test scripts. These test commands are typically hard coded in the test scripts, and in order to vary the commands and/or the load, the test scripts need to be changed.

To address some of the drawbacks of the traditional load testing approaches, performance and load testing tools have been developed. While many of these tools provide the ability to create hundreds or thousands of virtual users to apply consistent and repeatable loads on an application program, these tools are inflexible in that they do not allow automatic variations in the load. For example, these tools require manual intervention, for example, by a test developer familiar with the operation of the load testing tool, to vary the number of virtual users or the actions performed by the virtual users. Also, much like the traditional test scripts, these tools do not support messaging between the virtual users, which makes synchronizing and/or altering the load testing almost impossible.

It would be desirable to have a technique that would allow for generating and monitoring variable load on an application program.

BRIEF DESCRIPTION OF THE DRAWINGS

FIG. 2 illustrates selected contents of an example test phase information file, according to one embodiment.

FIG. 3 illustrates selected contents of an example configuration file, according to one embodiment.

FIG. 4 illustrates selected contents of an example client configuration file, according to one embodiment.

FIG. 5 is a block diagram illustrating selected components of a test package, according to one embodiment.

DETAILED DESCRIPTION

Figure 1:
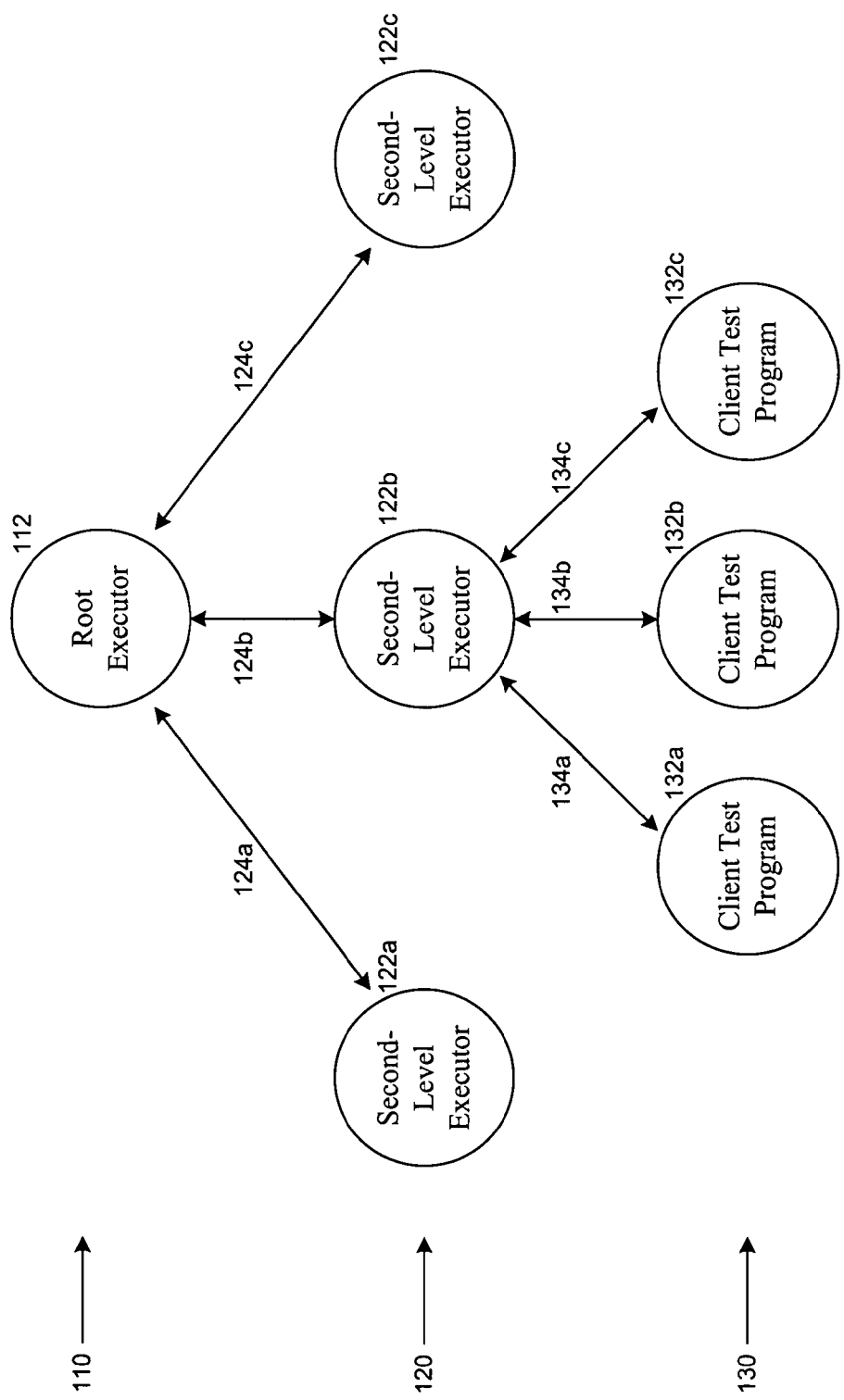
FIG. 1 is a diagram illustrating the executor hierarchy levels, according to one embodiment.

A software facility ("facility") facilitates the application of a time-varying load to an application program under test (AUT) using the application program's actual clients (as opposed to emulating the clients) and measuring the application program's performance characteristics as experienced by the clients. In one embodiment, the facility executes on a central computer system and includes an executor module. The terms "executor module" and "executor" are used interchangeably herein. The executor can execute in a multiple number of modes or hierarchical levels as dictated by information provided in the executor's configuration file. An instance of the executor executing at the highest or first-level of the hierarchy is referred to as a "root" executor. There is one root executor which is responsible for spawning numerous subordinate or second-level executors on, for example, remote computer systems. These second-level executors may spawn additional subordinate or third-level executors on the same or remote computer systems. Ultimately, the lowest-level or leaf executors are spawned, and these leaf executors are responsible for launching the client test program instances that are used to test the AUT.

In the discussion that follows, the operation of the executor will be described as executing either as a root executor or as a second-level or subordinate executor. Even though the executor is described in conjunction with operating within a two-level hierarchy, one skilled in the art will appreciate that the benefits and technical advantages provided by the executor need not be restricted to a two-level hierarchy. For example, the executor may operate in a hierarchical structure having more than two levels.

A user, such as a test programmer who is knowledgeable regarding the AUT, prepares a test phase information file and a configuration file. The test phase information file defines the multiple phases of a load test run. The configuration file initially contains information regarding the computer systems that are available to participate in the load test and the activities that are to be tested—i.e., performed by the AUT and the client test programs. An "activity" generally refers to a higher-level command or task that is performed by the AUT, and is typically accomplished or performed by performing one or more commands. The user may load or install the executor, the test phase information file, the configuration file, and the client test program onto a computer system. The user then starts executing an instance of the executor on the computer system. The executor first reads in the configuration file to determine if it is a root executor or a second-level executor. In one embodiment, the configuration file may contain an indication that dictates the executor's role—i.e., root executor or a second-level executor—as well as information needed for the executor to perform its role. If the executor identifies its role as a root executor, then the root executor populates the configuration file. By way of example, a configuration file may contain the following information:

Information to identify any parent executor.
Information regarding the phases of a load test run.
All the computer systems available to run or host lower-level executors. By way of example, this information may be conveyed in one of two ways:
as a subset of all the computer systems available, for example, in a laboratory which are not in use, or
as a specific set of computer systems to use, detailed in the root executor configuration file.
Information to allow the root executor to derive the initial set of second-level executors.
Information regarding the AUT, including how to configure the AUT for the load testing.
Information regarding the activities to be performed by each second-level executor.
Information needed for performance management and self-updating, such as ranges of counter values to log, desired activity rates, etc.

Upon reading its configuration file information, the root executor determines the number of second-level executors to use and generates a configuration file for each second-level executor. In one embodiment, the root executor determines the number of second-level executors and generates the second-level executors' configuration files by splitting the requested load into a number of smaller loads. A load is a measurement of the stress to place on the AUT. In one embodiment, the load is a set of one or more activities, where the contribution of each activity to the load is determined by the weight (i.e., activity points) assigned or given to the activity and the rate at which the activity is performed. Activities and weights are further discussed below. The root executor identifies a remote computer system for each second-level executor, and then downloads onto the remote computer systems a test package comprising an executor module and a client test program, and a configuration file for a second-level executor. The root executor then starts the second-level executor processes remotely, and appropriately configures the AUT so that it can be properly load tested. For example, if the AUT is an online meeting application server, the root executor may create any meetings that need to be created on the server. The root executor then starts listening on a network address, such as a port, waiting for the second-level executors to connect to that root executor. Once a communication channel is established for each second-level executor, the root executor listens, processes and relays messages to and from the second-level executors. In one embodiment, the root executor may also send messages to the second-level executors through the established communication channels.

In one embodiment, each of the configuration files for the second-level executors contain the same type of information that is contained in the root executor's configuration file, but with smaller numbers or values, as the root executor splits the load into several second-level executors. Each second-level executor reads in its configuration file and determines the number of client test programs to launch and generates a client configuration file for each client test program that is to be launched. The client configuration file contains information regarding the activity or activities the client test program is to perform. In one embodiment, each second-level executor generates the client configuration files by interpreting a set of constraints and target rates contained in its configuration file. Each second-level executor launches the client test processes locally—i.e., on the same computer system. Each second-level executor then listens on an address, such as a network port, and waits for the child client processes to connect to their respective second-level executor. Once a communication channel is established for each client process, the second-level executor listens, processes and relays messages to and from the client processes.

In one embodiment, a subordinate executor may be launched manually. For example, a user may be allowed to launch a second-level or other subordinate executor by submitting a command via a provided user interface. The user may be required to specify on the command line an address or port of a parent executor. When the subordinate executor is launched manually, it will have its own configuration information and the subordinate executor will report to the specified parent executor listening on the address or port specified in the command line. The parent executor may then read and/or modify the configuration information through the communication channel.

In one embodiment, a subordinate executor may be terminated manually. For example, a user may be allowed to terminate a subordinate executor by submitting a command via a provided user interface. If a subordinate executor terminates involuntarily, its parent executor may re-start it. If a subordinate executor is manually terminated, the subordinate executor may signal its parent executor before terminating, so the parent executor knows not to restart the subordinate executor that was shut down manually by the user.

In one embodiment, a root executor may provide a user interface through which a user can interact with the root executor, for example, in real-time. For example, a user can submit a command to stop a lower-level executor or executors. In other embodiments, the root executor may also provide a programmatic interface through which a program process can interact with the root executor. For example, a program process, such as an executing script, may instruct the root executor to stop a lower-level executor or executors. One skilled in the art will appreciate that the user interface and/or programmatic interface may be used to submit other commands to the root and/or lower-level executor. For example, the interfaces may be used to launch lower-level executors, request performance data, etc.

In one embodiment, the executor provides a mechanism, such as a user interface, through which a user may enter test commands that will be relayed to all relevant executors and eventually to all relevant client test processes. These commands may include, by way of example, "PAUSE_TEST," "STOP_TEST," "RESUME_TEST," "CHANGE_CONFIG," etc. The CHANGE_CONFIG command is a change to another set of configuration data which may be represented as a file. This can have a broad impact on the behavior of a running root executor. For example, a change made to the list of available computer systems may cause the root executor to shut down some instances of second-level executors, or start other second-level executors.

A user may submit test commands in order to implement client test process synchronization. For example, assuming that the AUT is an online meeting application server that supports slide presentations and two classes of users, "presenters" and "attendees," a user can pause all presenter client test processes just before a next slide is flipped, and then resume all of the client test processes—i.e., the presenter client test processes and the attendee client test processes—at once. One skilled in the art will appreciate that the test commands will vary based on the AUT. For example, for a messaging application server, a test command may be to send a test message to a recipient or multiple recipients.

In one embodiment, the executor may export the user interface commands through an externally-accessible programmatic interface which can be accessed by scripts or other controlling mechanisms. For example, a script may be able to issue commands such as PAUSE_TEST, STOP_TEST, RESUME_TEST, and CHANGE_CONFIG into a root executor, which will propagate the effects of these commands down the hierarchical structure of subordinate executors and client test processes. The externally-accessible programmatic interface allows a user to program a script or test program to implement client test process synchronization.

In one embodiment, the communication channels established between the executors and the client test processes allow for the sending and receiving of messages between the executors and the client test processes. The root executor can handle messages that it receives from second-level executors and take appropriate actions based on the received messages. By way of example, if the root executor receives a performance type message, the root executor may update any related counters. If the root executor receives a relay type message, the root executor may relay the message to all its second-level executors. The second-level executor can receive messages from both the root executor and the client test processes, and takes appropriate actions based on the received messages. By way of example, if the second-level executor receives a PAUSE_TEST message from the root executor, the second-level executor may send the message to all its client test processes. If the second-level executor receives a activity message that is specific to the AUT, such as, for example, a "JoinMeeting" message, from a client test process, the second-level executor can send the message to any performance counters that have registered for this type of message and relay this message to other, appropriate client test processes that may need to be informed of the message. The second-level executor may also relay the message to the root executor, which may re-relay the message to other second-level executors and client test processes.

In any mode of operation, the executor may provide a mechanism for calculating performance counters based on performance messages and other counters that it receives from other executors and/or client test processes.

In one embodiment, the contents of the configuration files may be updated during runtime—i.e., while the executor is executing. For example, the configuration file may be updated via live user intervention through a user interface, scripted or programmed intervention through a programmatic interface, a request to update configuration information sent from the root executor to, for example, a second-level or other subordinate executor, etc.

In the discussion that follows, various embodiments of the executor and its components are further described in conjunction with a variety of illustrative examples. It will be appreciated that the embodiments of the executor and its components may be used in circumstances that diverge significantly from these examples in various respects.

FIG. 1 is a diagram illustrating the executor hierarchy levels, according to one embodiment. The hierarchy levels 100 define a hierarchy of performance-measurement processes running across multiple computer systems. At the first-level 110 of the hierarchy is a root executor 112. The root executor is an instance of an executor running on a computer system. The root executor spawns a number of child executors in the second-level 120 of the hierarchy. By way of example, three second-level executors 122a, 122b, and 122c are illustrated in the second-level of the hierarchy as child executors spawned by the root executor. A communication channel, for example, channels 124a, 124b, and 124c, respectively, is established between the root executor and each second-level executor. Each of these communication channels facilitates the transfer of messages between the root executor and each of the second-level executors. In one embodiment, only one instance of an executor, whether it is running as a root executor or a second-level executor, is executing on any one computer system. Each of executors at the lowest level of the hierarchy (the second-level executors) spawns a number of client test programs in the third-level 130 of the hierarchy. By way of example, three client test programs 132a, 132b, and 132c are illustrated as being spawned by second-level executor 122b in the third-level of the hierarchy. The test programs are at the bottom of the hierarchy. A communication channel, for example, channels 134a, 134b, and 134c, respectively, is established between the second-level executor 122b and each client test program. Each of these communication channels facilitates the transfer of messages between second-level executor 122b and each of the client test programs. In one embodiment, each of the second-level executors spawns its client test programs locally—i.e., on the same computing system.

The executor hierarchy enables the collection of executors to: spawn multiple instances of the client test program; instruct each client test program instance on what needs to be done—i.e., what activities the client test program instance needs to perform—to accomplish user-specified performance targets; measure collective client test program performance and report the performance measurements to the user; allow user changes to performance goals during a load test run; and monitor the health of the client test programs during the load test run. The client test program needs to voluntarily provide performance information (the ability to send that kind of information needs to be added to the client test program in order for the Executor to update counters).

FIG. 2 illustrates selected contents of an example test phase information file, according to one embodiment. A user, such as a test programmer, creates a test phase information file that defines the multiple phases of a load test run. Each phase is associated with a time interval within the load test run, where the time is measured as relative time since the start of the load test run. In one embodiment, each phase results in the generation of configuration data which may be represented in a configuration file for that particular phase. The first phase starts at relative time 0:00, and each succeeding phase needs to start at a predetermined time boundary, such as, by way of example, a multiple of five-minutes, within the load test run.

As illustrated in FIG. 2, the test phase information file contains a list of phases 202. Each phase in the list of phases contains a phase duration 204 and an activity list 206. The phase duration specifies the relative time duration for the phase. The activity list specifies one or more activities that are to be performed during the phase. Each activity in an activity list contains a name 208, a point rating 210, a target rate 212, the resources to use in performing the activity 214, a latency time limit 216, and a rate limit 218. The name identifies the activity—i.e., it is the activity name. The point rating is a numerical weight or rating associated with the activity, and is an indication of the load that is undertaken/relinquished each time the activity is performed. In one embodiment, the activity point rating pertains to the amount of effort a client test program expends in performing that activity, and may be used to calculate how many client test programs to run on a computer system. While performing certain activities consume or contribute to the load of, for example, the AUT, other activities "free up" or lessen the load being undertaken by, for example, the AUT. For example, assuming that the AUT is a conferencing application, an activity which is to "join a meeting" may contribute to the AUT's load because of the additional processing associated with the additional participant in the meeting. Conversely, an activity which is to "leave a meeting" may lessen the load being undertaken by the AUT because of the reduction in the number of participants in the meeting. The user may adjust the activity point rating based on for example, observation of prior load tests, statistical analysis of performance measurements, etc.

The target rate is the number of times the activity is to happen per input period. The input period is a time span, such as, by way of example, one minute, two minutes, etc. The resources to use in performing the activity identify any resources that are required to perform the activity. For example, if the activity is to "flip a slide," the resources to use in performing the activity may identify a slide set containing the slide to flip. The latency time limit is a duration of time within which each invocation of the activity should be performed. In one embodiment, the latency time limit is a maximum latency before alarms are generated, for example, by the root executor. The rate limit is a percentage range specifying how much below/above the target rate the activity may be performed. If the activity is being performed outside the rate limit, the root executor may generate alarms.

FIG. 3 illustrates selected contents of an example configuration file, according to one embodiment. In general terms, the configuration file is the set of data that is used by an instance of a root executor. A user initially provides the information in the configuration file that is used by the root executor to derive the second-level executors and the configuration files for each second-level executor for each phase of a load test run as specified by a test phase information file. In one embodiment, the root executor uses the user-provided information and the load test run information contained in the test phase information file to populate its configuration file—i.e., derive the remaining items of information in the configuration file—and create a configuration file for each second-level executor for each phase in the load test run. The configuration files for the second-level executors contain the same set of information contained in the root executor's configuration file, but one or more of the items in the second-level executors' configuration files may have different values.

As illustrated in FIG. 3, the configuration file contains an identification of a parent 302, AUT information 304, a list of available computer systems 306, a load rating for each computer system 308, number of second-level executors 310, a list of activities to be performed by each second-level executor 312, a list of target rates 314, and a load rating for each client test program 316. The parent identifies a "parent" of the instance of the executor associated with the configuration file. If a parent is not specified in the configuration file, this indicates that the executor is to execute as a root. In one embodiment, if a parent exists, the parent is identified by its address—e.g., IP address and port number. For example, if the instance of the executor is running as a second-level executor, the parent will specify the address of its root executor.

The AUT information identifies the application program that is to be tested and the instances of the application program. As illustrated in FIG. 3, the AUT information may specify an address 320, passwords 322, AUT access information 324, and AUT instance information 326. The address specifies the location—e.g., URL—at which the server running or hosting the AUT can be found. The passwords specify the privilege information that is required to access the AUT. The AUT access information specifies any other information that may be needed to access the AUT and request the AUT to perform the activities. The AUT instance information contains a list of AUT instances that are running on the server and that need to be tested. Each AUT instance in the AUT instance information contains an address 328, a capacity 330, and a use duration 332. The AUT instance address identifies the particular instance of the AUT that is running and may also specify the address or location where the AUT instance can be accessed. The AUT instance capacity specifies a desired load, in terms of activities, that is to be placed on the AUT instance. For example, if the AUT instance is a collaboration server that is hosting a meeting, the load may specify the number of participants in the meeting. In one embodiment, the AUT instance capacity may be specified in terms of a numerical weight or rating that is based on the desired activities, and the activities' rates, that are to be performed by the AUT instance. The AUT instance use duration specifies how long the AUT instance is to be used for the test. The AUT instance is available for undertaking activities—i.e., load—during the length of time specified by the AUT instance use duration. In one embodiment, the AUT instance load duration is indicated by a minimum duration and a maximum duration, where the minimum duration is a minimum length of time the AUT instance is to be used and the maximum duration is a maximum length of time after which the AUT instance is not to be used for the test. Even though new load may not be placed on the AUT instance after the time period specified by the AUT instance load duration, existing load may be removed from the AUT instance.

The list of available computer systems identifies the computer systems available for launching second-level executors. The load rating for each computer system is an indication of the capacity—e.g., the measure of the computing power—of each computer system that is available for launching second-level executors. In one embodiment, the load rating is indicated by a numerical weight or rating that is based on the activities' point ratings. The number of second-level executors specifies the number of second-level executors that are to be used in performing the load test. In one embodiment, the root executor derives the number of second-level executors to launch based on the load—i.e., activities, activity rates, etc.— that is to be tested and the resources that are available—i.e., available computer systems, load ratings for the available computer systems, etc.—for testing the load. The number of second-level executors to use can be specified as a low-level definition (e.g., a list of client test programs and the activities to be performed by each client test program) or a high-level definition (e.g., the desired rates of activities per time duration). The list of activities to be performed by each second-level executor specifies the activities each second-level executor is responsible for having performed, for example by the client test program and the AUT. The list of target rates specifies the desired rates for the activities that are to be performed during the test. These are the target rates the root executor will attempt to enforce. The root executor may perform performance management and self-updating—e.g., parameter tuning—using the specified target rates and the performance measurements provided by the second-level executors. For example, if the received performance measurements indicate that the desired activity rates are not being met, the root executor may adjust the loads assigned to the computer systems for the next phase in the load test run. The load rating for each client test program specifies the amount of load each client test program can handle and the resources it consumes. In one embodiment, the load rating for each client test program is indicated by a numerical weight or rating that is based on the activities' point ratings.

FIG. 4 illustrates selected contents of an example client configuration file, according to one embodiment. A second-level executor generates a client configuration file for each instance of a client test program. The client configuration file contains an identification of a parent 402, AUT information 404, a list of activities to perform 406, and the number of times to perform each activity 408. The parent identifies the instance of the second-level executor that spawned the client test program instance associated with this client configuration file. The AUT information identifies the AUT instance that the client test program is to interact with in requesting the activities. The list of activities to perform specifies the activities that the client test program is to request the AUT instance specified by the AUT information to perform. The number of times to perform each activity indicates the number of times each activity is to be performed by the client test program.

One skilled in the art will appreciate that the activities and the other information specified in the test phase information file, configuration file, or the client configuration file are specific to the application and/or the load test desired by the user. For example, some applications may not have any activities that reduce the load on the application being tested. Moreover, some of the information may be specified in a different manner based on the application and/or the activity. One skilled in the art will also appreciate that some of the information in one or more of these files may be omitted based on the activity, the application, and/or the desired load test. Moreover, these files may contain other information based on the activity, application, and/or the desired load test.

FIG. 5 is a block diagram illustrating selected components of a test package, according to one embodiment. The test package is deployed on all computer systems that are to participate in a load test run. Initially, a user loads the test package on, for example, a computer system on which the root executor is going to run, and starts the executor. The executor runs as a root executor and is responsible for deploying the test package in the computer systems where the root executor starts a second-level executor. As depicted, the test package includes an executor 502 and a client test program 504. The executor contains the logic to execute either as a root executor or a second-level executor, and in either mode, the executor is driven by configuration information provided in, for example, the test phase information file and the configuration file. The executor is further described below. The client test program contains the logic to interact with the AUT and request the AUT to perform the activities. The client test program also contains the logic to measure the performance of the AUT and send performance messages to its parent—i.e., second-level executor. In one embodiment, the client test program logic comprises the dynamic link libraries and an executable linked with the lower-level API of the native client application of the AUT.

The computer systems on which the executors and the client test programs can execute may include a central processing unit, memory, input devices (e.g., keyboard and pointing devices), output devices (e.g., display devices), and storage devices (e.g., disk drives). The memory and storage devices are computer-readable media that may contain instructions that implement the subsystem, the interface files, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the executor and the client test programs may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The executor and the client test program may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
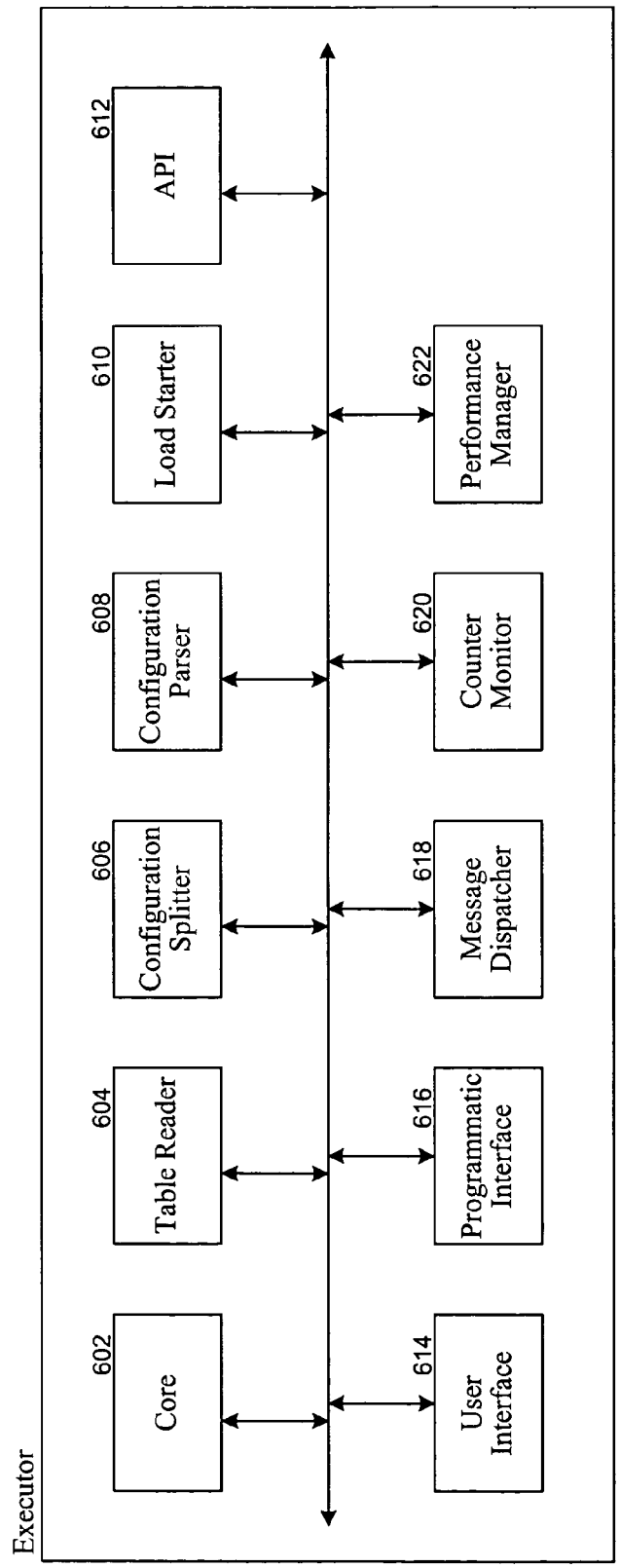
FIG. 6 is a block diagram illustrating selected components of an executor, according to one embodiment.

FIG. 6 is a block diagram illustrating selected components of an executor, according to one embodiment. The executor comprises a core 602, a table reader 604, a configuration splitter 606, a configuration parser 608, a load starter 610, an API 612, a user interface 614, a programmatic interface 616, a message dispatcher 618, a counter monitor 620, and a performance manager 622. In general terms, the core component is the executor's starting point, and it brings up all the other components of the executor, either directly or indirectly. In one embodiment, the core component reads an input configuration file and generates an in-memory image of the configuration file. The in-memory image of the configuration file is passed to the configuration splitter or the configuration parser, depending on whether the instance of the executor is running as a root executor or a second-level executor, respectively. The core component also configures the AUT in preparation for the load test. The core component starts up the other components of the executor, listens for signals of application termination from, for example, the API, and coordinates shutdown of the components.

The table reader component executes if the instance of the executor is running as a root executor. In one embodiment, the table reader component reads an input test phase information file that defines a load test run, and creates one instance of a configuration file for each phase of the test run. At start-up time, the table reader component produces the configuration for the first phase, stores it and then sleeps until it is time to apply the next phase. From then on, the table reader component alternates between sleeping and applying a test phase. For each test phase, it notifies the API component and passes the configuration for that test phase.

The configuration splitter component executes if the instance of the executor is running as a root executor. In one embodiment, the configuration splitter component takes as input the in-memory instance of the configuration file, which defines the load the user wishes to run. Using the information in the configuration file—e.g., the list of available computer systems and the load rating for each computer system—the configuration splitter component determines how many and which of the available computer systems will be used to generate the requested load—i.e., which computer systems are going host a second-level executor. The configuration splitter component then generates configuration file for each computer system. The generated configuration files may use the same format as the configuration file used by the root executor.

In one embodiment, the configuration splitter component is invoked at start-up and whenever there is a change to the configuration. When there is a change to the configuration, the configuration splitter component retrieves the list of currently running processes from the load starter component in order to start only the processes which are not currently running, thus minimizing the activity needed to perform a configuration change. In some embodiments, the configuration splitter component may be configured to deploy the test package onto the computer systems on which the second-level executors are going to run.

The configuration parser component executes if the instance of the executor is running as a second-level executor. In one embodiment, the configuration parser component takes as input the in-memory instance of the configuration file, and calculates the number of client test program instances needed and the configuration needed for the client test program instances to generate the requested load. The configuration parser component encapsulates knowledge regarding the available client test program drivers and what parameters can be passed to them. The configuration parser component is invoked at start-up and whenever there is a change to the configuration, and the configuration parser component produces the same type of output in both cases.

The load starter component takes as input the output generated by the configuration parser component or the configuration splitter component, which includes a list of processes (second-level executor or client test program), and for each process, its name, configuration file, and the computer system where the process is to be run. Based on the input, the load starter component performs start-up by running the desired executable. The load starter component uses notifications from the message dispatcher component to determine whether a child process it started has connected back to the current instance of the executor. The connection and sign-on messages over the established communication channel may serve as an indication that the child process is successfully spawned. In one embodiment, child processes that do not connect back within some reasonable timeout are killed and not restarted because restarting has the potential of invalidating the test and consuming an inordinate amount of resources.

In one embodiment, the load starter component is also invoked whenever the load changes. The load starter component maintains a list of all child processes that are currently running load and the computer systems the child processes are running on. When the load changes, the load starter component uses the child list to detect the changes, and may apply the changes in the following manner:

Stopping the computer systems that are running load: A child process may be terminated by sending a shutdown message to the process via the message dispatcher component, and then verifying that the process died;

Starting load on new computer systems by sending a configuration file: This is the same action performed at start-up on all participating computer systems; or Calculating a configuration delta and sending it to the child: There may be an instance where a child process was running previously and will continue to run, with a different configuration. The load starter component, in this case, can determine what changed in the configuration for that child and send the changes through the message dispatcher component, using the established communication channel with the child process.

The API component services runtime requests from external entities to, for example, change the load configuration, execute commands, etc. The external entities may include the following:

A user operating the root executor; these requests are sent to the API component via the user interface component;

A script sending requests to the root executor; these requests are sent to the API component via the programmatic interface component. The same mechanism may be used to feed load test phases from a test phase information file.

A parent of the current executable instance; second-level executors may receive indirect commands from the parent executor through their communication channels. In one embodiment, these commands are first seen by the message dispatcher component, which invokes the API component in the same manner as the user or a script would.

Changes to load configuration can affect any part of the data contained in the current configuration file. Changes can be made to multiple items at one time. In one embodiment, changes may be applied by updating the configuration file in memory and then feeding the new configuration into the configuration parser component (for second-level executors) or the configuration splitter component (for root executors) so that these components can re-generate the configuration for the child processes. Changes to multiple items are processed atomically, by invoking the configuration parser component or the configuration splitter component, respectively, only once.

In one embodiment, commands are addressed to a particular client test program or a particular executor. The address of an executor as exposed by the API component can serve as the network name of the computer system where the instance of the executor is running. The address of a client test program at the API component may be the second-level executor's address concatenated with the client test program instance identifier (for example, "Q.A"). In one embodiment, commands understood by the API component include:

PAUSE_TEST: pause the current run;

RESUME_TEST: resume the run from a previous pause;

RESET_TEST: stop all children from the current executor, re-read the configuration files and start the load again; and TERMINATE_TEST: abort the current run by ending all child processes.

In one embodiment, when an executor's API component receives a command that is addressed to it, it acts on the command by setting internal state information and forwarding the command recursively to all child executors and client test programs.

In one embodiment, the root executor generates alarms, and the API component can notify the user interface component of the generated alarms. The API component may also send the alarms to scripts via callbacks. For example, an alarm sent to the user interface component may signify that the root executor is not being able to obtain the performance load requested by the user, probably because of server errors. The trigger for the API component to generate an alarm may be sent in by the counter monitor component. Alarms may also be sent to any running script that has registered for alarms with the top-level root executor.

The user interface component executes if the instance of the executor is running as a root executor. In one embodiment, the user interface component performs its work by utilizing the API component, and may allow users to perform the following:

View the configuration as it is stored in memory for the current executor and for all executors and client test programs subordinate to the current executor;

Change configuration items for the current executor in batches: multiple changes can be applied without committing, and then submitted at once; and Send commands to the current executor or any executor or client test program subordinate the current executor.

In one embodiment, the user interface component may be executed in a thread separate from the real-time root executor functions. In another embodiment, the user interface component may be implemented as a graphical user interface.

The programmatic interface component allows the API component functions to be called in an automated fashion from outside the executor process. In one embodiment, the programmatic interface component is only accessible in the root executor, and the programmatic interface component may be made available by making part of the API component objects "remotable" in the NET infrastructure.

The message dispatcher component utilizes a message transport component (not shown), such as, by way of example, TCP/IP, to establish a live connection—i.e., a communication channel—with the parent executor and with all child processes. This live connection is kept throughout the life of each process. In one embodiment, a child process that breaks the connection is assumed to have terminated and can no longer be controlled by executor.

In one embodiment, the message dispatcher component delivers messages and does not consume any messages. A message refers to an exchange of information done in real-time between two executors or an executor and a client test program, and these messages are passed over the message transport component and, in particular, the established communication channels. Each message traveling through the message dispatcher component is addressed explicitly to one of the following:

a specific node (root executor, second-level executor, client test program);

the parent executor;

a specific module within the executor; or all nodes;

In one embodiment, messages can be of several types, such as, by way of example, commands, performance, relay, and configuration-change. The message dispatcher component may deliver messages to internal components based on the type (e.g., the API component for commands, the performance manager component for performance, etc.) and based on registrations made by objects interested in receiving the messages.

In one embodiment, messages received from a child node that is addressed to "all nodes" are first propagated up the hierarchy to the root executor, and then down the hierarchy to their destination nodes. The message dispatcher component also sends heartbeat messages to every child process that has not sent any messages for some predetermined amount of time. In one embodiment, child processes have a set time to respond to heartbeat messages, and child processes that do not respond to heartbeats are killed and not restarted, since restarting can lead to invalid load results.

The counter monitor component executes if the instance of the executor is running as a root executor. The counter monitor component uses input received from the performance manager component to decide when to generate alarms into the API component. The counter monitor component can compare the current performance goals/targets with the actual performance being observed by the system—i.e., the second-level executors and the client test programs. The performance goals may be specified as a series of target activity rates, which may include a level of accepted deviation. When the data collected from the performance counters indicates that the accepted deviation from a given target rate was exceeded, the counter monitor component generates an alarm into the API component, which then notifies the interested parties.

The performance manager component is initiated at start-up and the counter monitor component signs up to receive counter updates from the performance manager. The performance manager component interprets performance messages it receives from the message dispatcher component and publishes performance counters, which are made accessible external to the executor.

The aforementioned components of the executor are only illustrative, and the executor may include other components and modules not depicted. Furthermore, the functionality provided for in the components and modules may be combined into fewer components and modules or further separated into additional components and modules.

Figure 7:
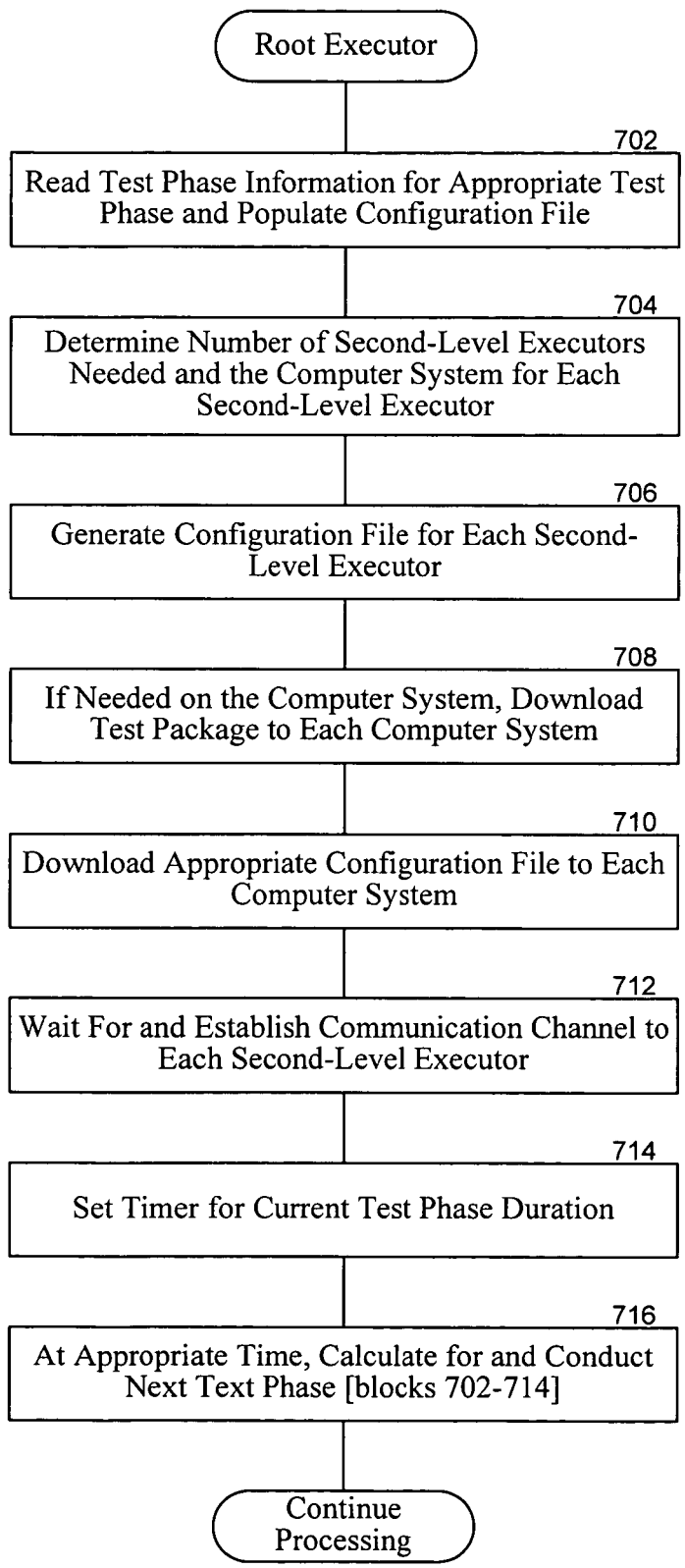
FIG. 7 is a flow diagram that illustrates the processing of a root executor, according to one embodiment.

FIG. 7 is a flow diagram that illustrates the processing of a root executor, according to one embodiment. By way of example, a user may have prepared a test phase configuration file and a configuration file and started an instance of an executor on a computer system, and the executor may have read in sufficient data from the configuration file to determine that it is a root executor. In block 702, the root executor reads in the test phase information for the appropriate test phase and populates the configuration file. For example, when the executor first starts executing, the appropriate test phase is the first phase of the test.

In block 704, the root executor determines the number of second-level executors that are needed to generate the test load that is requested in the current phase of the test, and identifies the computer systems on which each instance of the second-level executor is going to run. In distributing the test load, the root executor may have to exceed the capacity of the computer systems. For example, there may be more load than the total capacity of the computer systems. In one embodiment, the root executor may first fill each computer system to its stated capacity, and then distribute the additional load by, for example, evenly distributing the additional load amongst the computer systems, assigning more load to the computer systems that are expected to free up load during this test phase, etc. Conversely, in assigning activities that free up load, the root executor may assign these activities to the computer systems that are currently running loads that exceed their stated capacity.

In block 706, the root executor generates a configuration file for each second-level executor. In one embodiment, each configuration file specifies the number of client test programs to launch and the activities and the activity rates for each client test program. In block 708, the root executor downloads a test package to each computer system identified in block 704 that does not already have the test package. For example, one or more of the computer systems may have received the test package during a previous phase of the test.

In block 710, the root executor downloads the appropriate configuration files to each of the identified computer systems. For example, the root executor may have tailored certain configuration files for specific computer systems based, for example, on the capacity of the computer system, the load currently being placed on the computing system (e.g., the computer system's load at the end of a previous test phase), etc. In one embodiment, if an instance of the executor is not already executing on each of the identified computer systems, the root executor may launch the executor on these computer systems. In block 712, the root executor waits for and establishes a connection—i.e., communication channel—with each of the second-level executors. In block 714, the root executor sets a timer for the current test phase duration. The actual time may be less than the duration of the current test phase. During this time, the root executor may receive and process messages e.g., performance messages, etc.) and/or commands (e.g., commands to reconfigure items in the configuration file and/or the test phase information file, etc.) from its second-level executors and/or the user. In block 716, at the appropriate time, for example, when the timer set in block 714 expires, the root executor calculates for and conducts the next test phase by performing blocks 702-714. The root executor repeats this process until all the phases of the test are performed.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 8:
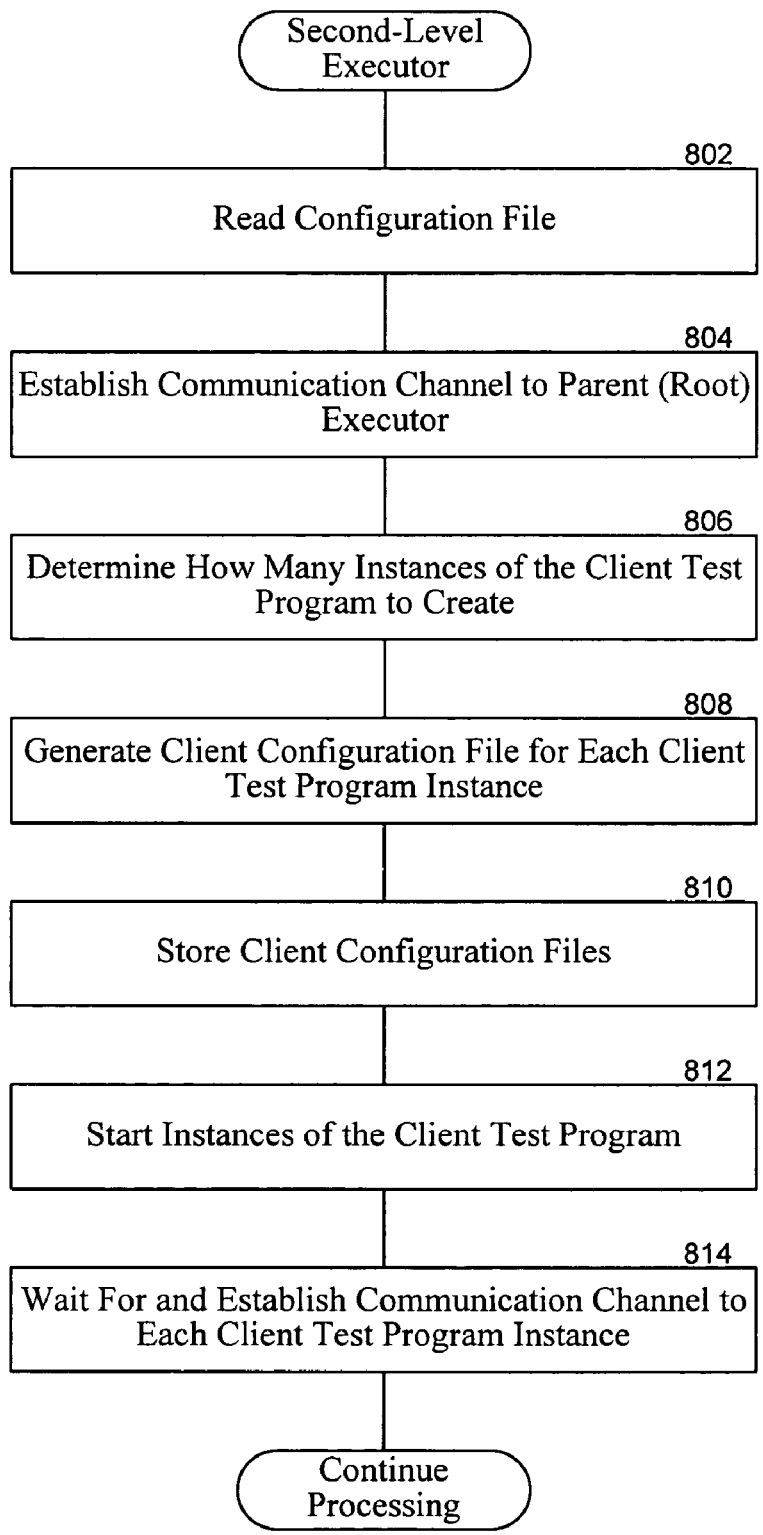
FIG. 8 is a flow diagram that illustrates the processing of a second-level executor, according to one embodiment.

FIG. 8 is a flow diagram that illustrates the processing of a second-level executor, according to one embodiment. By way of example, the root executor may have downloaded a test package and a configuration file onto a computer system designated to host a second-level executor, and launched the executor. In block 802, the executor reads in the configuration file and identifies itself as a second-level executor. In block 804, the second-level executor establishes a communication channel to its parent that is identified in the configuration file—i.e., the root executor. In block 806, the second-level executor determines how many instances of the client test program to launch. In one embodiment, the number of client test programs to launch is provided in the configuration file. In another embodiment, the second-level executor may calculate the number of client test programs to launch using information contained in the configuration file. For example, the second-level executor process may calculate the number of client test programs to launch using information such as, the load to be placed on the AUT, list of activities to be performed, target rates, load ratings for the client test programs, etc. In block 808, the second-level executor generates a client configuration file for each client test program instance it is to launch. In block 810, the second-level executor stores the generated client configuration files, for example, in memory. In block 812, the second-level executor starts the instances of the client test program on the computer system. In block 814, the second-level executor waits for and establishes a communication channel with each of the client test program instances.

Figure 9:
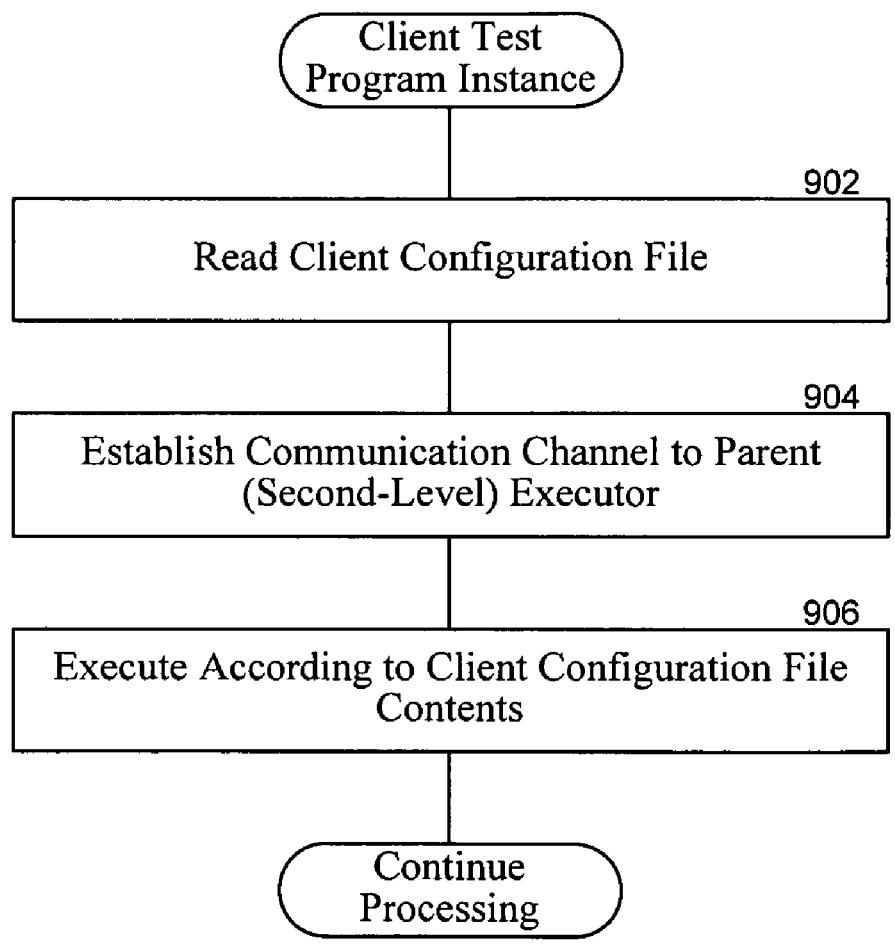
FIG. 9 is a flow diagram that illustrates the processing of a client test program, according to one embodiment.

FIG. 9 is a flow diagram that illustrates the processing of a client test program, according to one embodiment. By way of example, the second-level executor may have launched the client test program on the computer system. In block 902, the client test program reads in its configuration file from memory. In block 904, the client test program establishes a communication channel to its parent that is identified in the configuration file—i.e., the second-level executor. In block 906, the client test program executes according to the client configuration file contents. For example, the client test program may establish a connection to the AUT that is specified in the configuration file and interact with the AUT to perform the activities specified in the configuration file. In one embodiment, the client test program may contain logic to measure performance, such as, response times, throughput counts, etc., and send these measurements to its parent over the communication channel as performance messages.

In one embodiment, the root executor may create a preview of all the phases of a test run, with each phase specifying the computer systems and the activities that are to be performed on the computer systems. The root executor can generate the preview by generating the configuration files for the second-level executors—i.e., the computer systems—in the first phase. The information in these configuration files may be used to generate a preview of the first phase of the test run. The root executor can then use the combination of the preview of the first phase and the test phase information regarding the second phase of the test run to generate the configuration files for the second-level executors in the second phase. The information in these configuration files may be used to generate a preview of the second phase of the test run. The root executor can repeat this process for the remaining phases of the test run to generate a preview of all the phases of the test run.

In at least one embodiment, the described techniques provide the ability to divide and assign a test load between multiple target computer systems based on the computer systems' characteristics and the AUT-specific test run criteria. The techniques also provide the ability to configure individual client test programs on a computer system based on its assigned load.

In at least one embodiment, the described techniques provide a messaging infrastructure to relay messages in the hierarchy for control and performance measurements. The messaging infrastructure also provides the ability to "plug-in" a user supplied application and allow the application to send or broadcast a message for specific control or status requests from a central computer system to all or a subset of the nodes in the hierarchy.

In at least one embodiment, the described techniques provide a mechanism for harvesting performance data from individual messages, collating the data across multiple nodes in the hierarchy in a synchronized manner, and raising alarms at a central node in the hierarchy when the measurements fall outside user-specified boundaries.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer system with a central processing unit and memory for generating and monitoring variable load on an application under test (AUT), the computer system comprising:
  a first level of a hierarchy comprising a first instance of an executable being operable to:
  determine a load to place on an AUT in each phase of a test run comprising a plurality of phases;
  for each phase of the test run:
    determine a number of instances of the executable to create in a second level of the hierarchy, wherein the number of instances of the executable to create in the second level of the hierarchy is based on the load to place on the AUT in the particular phase of the test run and a number of computer systems available to execute the instances of the executable in the second level of the hierarchy in the particular phase of the test run;
    generate a configuration file for each of the instances of the executable in the second level of the hierarchy;
    launch the instances of the executable in the second level of the hierarchy, each instance of the executable being launched on one of the computer systems that are available to execute the instances of the executable in the second level of the hierarchy;
    listen for a connection from each of the instances of the executable in the second level of the hierarchy; and
  a second level of the hierarchy comprising a plurality of instances of the executable, each instance of the executable being operable to:
  establish a connection to the instance of the executable in the first level of the hierarchy;
  determine a number of instances of a test program to create on the computer system;
  generate a client configuration file for each instance of the test program to create;
  store the client configuration files;
  launch the number of instances of the test program; and
  listen for a connection from each instance of the test program,
such that each instance of the test program connects to the instance of the executable executing on the same computer system, and each instance of the test program executes according to its client configuration file.

2. The computer system of claim 1, wherein the load is based on desired rates of activities to perform per time period.

3. The computer system of claim 1, wherein the configuration file generated for each instance of the executor in the second level of the hierarchy specifies a list of activities to be performed by the instance of the executor in the second level of the hierarchy.

4. The computer system of claim 1, wherein the number of instances of the executable to create in the second level of the hierarchy is based on the state of the preceding phase of the test run.

5. The computer system of claim 1, wherein the number of instances of the executable to create in the second level of the hierarchy is based on a load rating for each of the computer systems available to execute the instances of the executable in the second level of the hierarchy.

6. The computer system of claim 1, wherein the connection between the first instance of the executable in the first level of the hierarchy and each of the instances of the executable in the second level of the hierarchy facilitate the sending of messages between the instances of the executable.

7. The computer system of claim 6, wherein the messages are relay type messages.

8. The computer system of claim 6, wherein the messages are performance type messages.

9. A computer-implemented method for generating and monitoring variable load on an application under test (AUT), the method comprising:
  determining whether an executable is to execute in a first mode or a second mode of operation;
  responsive to determining that the executable is to execute in the first mode of operation:
    determining a load to place on an AUT in a first phase of a test run comprising a plurality of phases;
    determining a number of instances of the executable that are to execute in the second mode of operation, wherein the number of instances of the executable that are to execute in the second mode of operation is based on the load to place on the AUT in the first phase of the test run and a number of computer systems available to execute the instances of the executable that are to execute in the second mode of operation in the first phase of the test run;
    generating a configuration file for each of the instances of the executable that are to execute in the second mode of operation;
    launching the instances of the executable that are to execute in the second mode of operation, each instance of the executable being launched on one of the computer systems that are available to execute the instances of the executable that are to execute in the second mode of operation;
    listening for a connection from each of the instances of the executable that is executing in the second mode of operation; and
  responsive to determining that the executable is to execute in the second mode of operation:
    establishing a connection to the instance of the executable that is executing in the first mode of operation;
    determining a number of instances of a test program to create;
    generating a client configuration file for each instance of the test program to create;
    storing the client configuration files;
    launching the number of instances of the test program; and
    listening for a connection from each instance of the test program,
such that each instance of the test program connects to the instance of the executable that is executing in the second mode of operation, and each instance of the test program executes according to its client configuration file.

10. The method of claim 9 further comprising, responsive to determining that the executable is to execute in the first mode of operation:
  determining a load to place on an AUT in a second phase of the test run comprising the plurality of phases;
  determining a number of instances of the executable that are to execute in the second mode of operation, wherein the number of instances of the executable that are to execute in the second mode of operation is based on the load to place on the AUT in the second phase of the test run and a number of computer systems available to execute the instances of the executable that are to execute in the second mode of operation in the second phase of the test run;

generating a configuration file for each of the instances of the executable that is to execute in the second mode of operation; and launching the instances of the executable that are to execute in the second mode of operation, each instance of the executable being launched on one of the computer systems that are available to execute the instances of the executable that are to execute in the second mode of operation.

11. A computer system with a central processing unit and memory implementing a hierarchical system for generating and monitoring variable load on an application under test (AUT), the system comprising:

a first level of a hierarchy comprising a first instance of an executable;

a second level of the hierarchy comprising a plurality of instances of the executable, each of the instances of the executable in the second level of the hierarchy being a child of the first instance of the executable;

a third level of the hierarchy comprising a plurality of instances of a client test program, each of the instances of the client test program being a child of one of the instances of the executable in the second level of the hierarchy;

a communication channel between each of the plurality of instances of the executable in the second level of the hierarchy and its parent in the first level of the hierarchy; and a communication channel between each of the plurality of instances of the client test program and its parent in the second level of the hierarchy, wherein the first instance of the executable determines the number of its children executable instances in the second level of the hierarchy, and further wherein each of the instances of the executable in the second level of the hierarchy determines the number of its children client test program instances.

12. The computer system of claim 11, wherein the number of children executable instances in the second level of the hierarchy is based on a load to place on an application under test.

13. The computer system of claim 11, wherein each instance of the executable in the second level of the hierarchy determines the number of its children client test program instances based on the activities the instance of the executable is to perform.

14. The computer system of claim 11, wherein each instance of the executable in the second level of the hierarchy is operable to be started by its parent in the first level of the hierarchy.

15. The computer system of claim 11, wherein at least one instance of the executable in the second level of the hierarchy is operable to be started manually.

16. The computer system of claim 11, wherein at least one instance of the executable in the second level of the hierarchy is operable to be terminated by its parent in the first level of the hierarchy.

17. The computer system of claim 11, wherein at least one instance of the executable in the second level of the hierarchy is operable to be terminated manually.

18. The computer system of claim 11, wherein the first instance of the executable in the first level of the hierarchy allows a user to enter a test command, wherein the first instance of the executable relays the user-entered test command to at least one child in the second level of the hierarchy.

19. The computer system of claim 18, wherein the at least one child in the second level of the hierarchy relays the user-entered test command to at least one child in the third level of the hierarchy.

20. The computer system of claim 11, wherein the communication channels allow messages to be passed between the instances of the executable in the first and second levels of the hierarchy and the instances of the client test program in the third level of the hierarchy.

* * * * *

UNITED STATES PATENT AND TRADEMARK OFFICE
CERTIFICATE OF CORRECTION

PATENT NO. : 7,587,638 B2 Page 1 of 1
APPLICATION NO. : 11/067487
DATED : September 8, 2009
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-first Day of September, 2010

David J. Kappos
*Director of the United States Patent and Trademark Office*